Patented June 6, 1950

2,510,466

UNITED STATES PATENT OFFICE 2,510,466

PROCESS FOR THE PREPARATION OF SURFACE-ACTIVE ORGANIC NITROSATION-SULFITATION PRODUCTS IN THE POLYVALENT METAL SALT FORM

William A. Fessler, Prince George County, Va., assignor to Allied Chemical & Dye Corporation, a corporation of New York No Drawing. Application September 17, 1946, Serial No. 697,578

10 Claims. (Cl. 260—429)

This invention relates to nitrosation-sulfitation products, that is, compositions obtained by reacting an unsaturated organic compound or mixture of compounds containing a non-aromatic

linkage with a nitrosating agent (a nitrosyl halide, nitrogen trioxide or nitrogen tetroxide) and reacting the resulting nitrosation product with a water-soluble sulfite.

It relates more particularly to a method for producing derivatives of said nitrosation-sulfitation products where the cation is a polyvalent metal.

Preparation of nitrosation-sulfitation products having surface-active properties has been disclosed in a number of prior patents. Thus, U. S. Patent 2,265,993 describes manufacture of surface-active compositions by forming an addition product of a nitrosyl halide, specifically nitrosyl chloride or nitrosyl bromide, with unsaturated aliphatic compounds or mixtures thereof, specifically olefins or a mixture of olefins containing 10 to 30 carbon atoms, and reacting the resulting addition products with a water-soluble sulfite in aqueous solution. The surface-active compositions obtained by this process comprise as their principal components, sulfonated ketones, sulfonated amines, sulfonated alkylidene sulfamates, sulfonated alkyl sulfamates, and bisulfite addition products of sulfonated alkylidene sulfamates. Compositions derived from olefins having 10 to 30 carbon atoms are especially valuable as detergents, and as wetting, dispersing and emulsifying agents.

U. S. Patent 2,336,387 discloses the similar manufacture of certain surface-active compositions of said type from carboxyl-substituted unsaturated (i. e. olefinic) hydrocarbons and mixtures thereof (that is, those containing at least one carboxylic substituent, for example, a carboxylic acid radical, a carboxylic ester radical, an amide radical, an acid halide radical, or a nitrile radical). The compositions obtained comprise mixtures of sulfonates and sulfamates as set out above containing a carboxylic substituent, and combining in their properties the characteristics of the carboxylic radical with those of the solubilizing groups introduced by nitrosation and sulfitation.

Moreover, as disclosed in U. S. Patent 2,313,719, surface-active nitrosation-sulfitation products, similar to those obtained according to the aforesaid patents, can be prepared from corresponding unsaturated starting materials by reaction with nitrogen oxides, particularly nitrogen trioxide or tetroxide, to form an addition product, followed by a sulfitation procedure similar to that described in the above-mentioned patents.

Surface-active nitrosation-sulfitation products can also be prepared by processes similar to those of the foregoing patents, employing mixtures of the various nitrosating agents disclosed therein, for example, nitrosyl chloride containing about 5% of nitrogen tetroxide.

The water-soluble mixtures obtained according to the aforesaid patents are herein designated as "nitrosation-sulfitation products"; and the intermediate addition products which are subjected to sulfitation, for example, by reaction with a water-soluble sulfite in aqueous solution, are designated as "nitrosation products." The term "nitrosating agent" is used herein to designate a member of the group consisting of NOCl, NOBr, $N_2O_4$, $N_2O_3$, and mixtures of two or more thereof.

The salts of the specific class to which the invention relates are polyvalent metal salts of mixtures of acids corresponding to organic anions of said nitrosation-sulfitation products, and especially to the organic anions of the nitrosation-sulfitation products of the aforesaid Beckham patents.

The said polyvalent metal salts are characterized by unusually good solubility in many organic water-immiscible solvents, as compared with the corresponding alkali metal and ammonium salts, and they possess, at the same time, valuable surface-active properties. Hence they are valuable addition agents for compositions containing such solvents.

For example, the aluminum salt is soluble in trichloroethylene wherein it exerts dry cleaning action. The copper salt is adsorbed by fibers and can be used to render fabrics resistant to fungus attack. The magnesium salt is an effective emulsifying agent.

It has been proposed to prepare alkaline earth and heavy metal salts of the nitrosation-sulfitation products by acidifying nitrosation-sulfitation products in the form of their alkali metal or ammonium salts, to liberate the organic acids of said nitrosation-sulfitation products, and reacting the resulting organic acids with suitable bases.

According to the present invention, polyvalent metal salts of mixtures of acids corresponding to organic anions of nitrosation-sulfitation products are prepared by reacting nitrosation-sulfitation products in the form of water-soluble salts (for example, alkali metal or ammonium salts obtained in the foregoing manner) with water-soluble salts of polyvalent metals in reaction media containing water and an alcoholic solvent of low water-solubility.

The alcoholic solvent may be an alcohol of low water-solubility (i. e. having a solubility of 10 parts or less per 100 parts by weight of water at 15° C.), and especially one which is an aliphatic monohydric alcohol containing 4 to 8 carbon atoms (namely, straight-chain or branched-chain, primary, secondary or tertiary, butyl, amyl, hexyl, heptyl or octyl alcohol); or it may be a mixture of a water-soluble alcohol with a water-immiscible solvent in sufficient amount to reduce the solubility of the alcohol to a low water-solubility (such as, a mixture of a water-soluble alcohol with a sufficient amount of a liquid aromatic hydrocarbon or a low-boiling paraffinic hydrocarbon to impart a solubility to the mixture of 10 parts or less per 100 parts of water at 15° C.). Examples of the latter type of alcoholic solvent are mixtures of equal parts by weight of isopropyl alcohol and benzene and equal parts by weight of isopropyl alcohol and petroleum naphtha. The alcoholic solvent also may be a mixture of an alcohol of low water-solubility with a water-immiscible solvent (such as, a mixture of an aliphatic monohydric alcohol containing 4 to 8 carbon atoms and a hydrocarbon solvent). Examples of such solvent mixtures are equal parts by weight of isobutyl alcohol and benzene and equal parts by weight of isobutyl alcohol and petroleum naphtha.

I have found, in accordance with the present invention, that polyvalent metal salts of the nitrosation - sulfitation p r o d u c t s, which are formed by metathesis between the water-soluble nitrosation-sulfitation products and the heavy metal salts, are soluble to a much greater extent in such alcoholic solvents than are the water-soluble salts of the nitrosation-sulfitation products, and hence accumulate in the alcoholic solvent. Since the alcoholic solvent has low water-solubility, in general the alcoholic solution of the polyvalent metal salt of the nitrosation-sulfitation product can be separated from the aqueous solution of water-soluble salts by stratification.

Preferably, the reaction is effected by contacting a solution of the water-soluble salt form of the nitrosation-sulfitation product in an alcoholic solvent of low water-solubility (for example, an alcohol of low water-solubility or a mixture of a water-soluble alcohol with a hydrocarbon) with an aqueous solution of the polyvalent metal salt. The solutions are brought into intimate contact by agitation or other suitable means. The reaction can be facilitated by heating the mixture under refluxing conditions; but such procedure is not preferred, because it may lead to some decomposition of constituents of the nitrosation-sulfitation products.

In a preferred method of procedure, the solution of water-soluble nitrosation-sulfitation product salts in alcoholic solvent is contacted repeatedly with successive portions of an aqueous solution of a water-soluble polyvalent metal salt, for example, a polyvalent metal salt of an inorganic acid or other acid which forms water-soluble salts with the cation of the nitrosation-sulfitation product. An advantageous method of carrying out the latter preferred procedure involves countercurrent flow of streams of each of said solutions.

The proportions of water-soluble polyvalent metal salt employed in aqueous solution with respect to the water-soluble nitrosation-sulfitation product salts may vary. Preferably, sufficient water-soluble polyvalent metal salt is employed to provide at least one equivalent of polyvalent metal ion for each equivalent of alkali metal or ammonium ion. The ratio of polyvalent metal ions to alkali metal or ammonium ions preferably employed will vary with the conditions of the extraction. For example, if a countercurrent extraction equivalent to several theoretical plates is employed, a ratio of polyvalent metal ions to alkali metal or ammonium ions only slightly greater than one will give a high replacement of the alkali metal or ammonium ions. In such a countercurrent operation a ratio between 1.0 and 1.5 is preferred. On the other hand, if single batch contacting at ordinary temperatures is employed, a much higher ratio of polyvalent metal ions to alkali metal or ammonium ions will be required to obtain a high replacement; for example, a ratio as high as five equivalents of polyvalent metal ions per equivalent of alkali metal or ammonium ions may be required to achieve a product of satisfactory purity. Compared with single batch contact, multiple batch contact permits reduction in the amount of polyvalent metal ion used to achieve the same extent of ion replacement, or it permits a greater replacement of alkali metal or ammonium ions per unit amount of polyvalent metal ions.

In many cases the mixtures obtained in accordance with the present invention appear to differ in chemical composition from the corresponding mixtures obtained by liberation of the corresponding acids from their alkali-metal or ammonium salts and subsequent reaction with suitable bases. For example, treatment of an aqueous solution of an alkali metal or ammonium salt of a nitrosation-sulfitation product with a strong acid to liberate the acids corresponding to the organic anions of the nitrosation-sulfitation product tends to hydrolyze some of the sulfamate groups of the components, and to split off some of the water-solubilizing groups formed as a result of addition of bisulfite to carbon-nitrogen double bonds during sulfitation, leading to transformation of small amounts of the organic components of the nitrosation-sulfitation product into water-insoluble oils, and reduction in the water-solubility of such components. This effect is avoided by the process of the present invention.

The surface - active nitrosation - sulfitation products employed according to the invention are obtained from unsaturated organic compounds, preferably olefinic hydrocarbon mixtures and especially of the petroleum type, containing 10 to 30 carbon atoms per molecule, and especially those containing 14 to 23 carbon atoms per molecule.

Preferably they are employed in the form of their alkali-metal, especially sodium, salts.

The nitrosation - sulfitation products can be prepared by the general procedures disclosed in U. S. Patents 2,265,993, 2,313,719 and 2,336,387. For example, a nitrosating agent, i. e. a nitrosyl halide (nitrosyl chloride or bromide), or nitrogen tetroxide or trioxide, or a mixture of two or more of these nitrosating agents, is reacted with an unsaturated organic compound or mixture of compounds at relatively low temperatures, e. g. from —20° to 80° C., and preferably from 0° to 40° C., until part or substantially all of the non-aromatic

linkages in the unsaturated compound have reacted, about 1 to 2 mols of the nitrosating agents being added per

group. Sulfitation of the resulting nitrosation mixture is effected by treatment with an aqueous solution of a water-soluble sulfite, e. g. at temperatures of from 60° to 130° C. Suitable sulfites include bisulfites and sulfites of sodium, ammonium or potassium; a mixture of alkali metal sulfite and bisulfite in molecular ratio of 1:1 to 5:1 being preferably employed, and 2½ to 5 mols of sulfites being employed for each nitrosated

linkage. The reaction mixture advantageously contains a water-soluble solvent such as isopropyl alcohol. Preferred details of sulfitation are described in U. S. Patents 2,373,643 and 2,343,362. Unreacted water-insoluble compounds are removed by decantation and extraction as disclosed in U. S. Patent 2,383,120. Residual organic solvent may be removed by distillation in accordance with U. S. Patent 2,381,658. The solution thus obtained, in addition to surface-active nitrosation-sulfitation products, contains inorganic salts including unreacted sulfites, traces of oil, and organic decomposition products formed during nitrosation and sulfitation.

In application of L. J. Beckham, Serial No. 637,068, filed December 22, 1945, now Patent No. 2,436,243, for "Purification of organic nitrosation-sulfitation products," a process is described wherein nitrosation-sulfitation products of the type treated in accordance with the present invention are produced in a purified form containing relatively small amounts of inorganic salts, by mixing an aqueous solution of said nitrosation-sulfitation product with a solvent which is incompletely miscible with said aqueous solution, containing at least 50% by weight of a monohydric alcohol of 3 to 5 carbon atoms (that is, a normal or iso, primary, secondary, or tertiary propyl, butyl or amyl alcohol), whereby a solution of said nitrosation-sulfitation product in said solvent is obtained. The process of the present invention is advantageously applied directly to alcoholic solutions of water-soluble nitrosation-sulfitation products obtained in accordance with the process of said Beckham application.

The unsaturated organic compounds employed as intermediates for the nitrosation products, from which the salts of this invention are derived, include the classes of compounds disclosed in the above-mentioned Beckham Patents 2,265,993, 2,313,719 and 2,336,387. Thus they include organic compounds having 10 to 30 carbon atoms and having at least one non-aromatic

linkage. More particularly they include olefin hydrocarbons as well as carboxyl derivatives thereof, comprising free carboxylic acids, their esters, salts, amides, chlorides, and the corresponding nitriles. Starting materials especially adapted for the manufacture of products destined for use as detergents, wetting and emulsifying agents, and the like are compounds having 10 to 30 carbon atoms per ethylenic linkage, of which at least 8 of the carbon atoms are disposed in a continuous carbon chain. Of the olefin hydrocarbons, mono-olefins having a carbon content which lies within the range 12 to 23 carbon atoms are especially suitable for the manufacture of cleansing agents. (It is to be understood that, where ranges are given herein, they include the limits.)

The unsaturated organic compounds serving as raw materials may be straight-chain compounds, or secondary or tertiary branched-chain compounds. They may contain one or more, especially one to two, non-aromatic

linkages per molecule. The double bonds may be located at terminal or intermediate positions in the carbon chains. The most valuable compounds for detergent purposes are obtained from olefins and carboxyl-substituted olefins containing an olefinic linkage at the end of a carbon chain of at least 8 carbon atoms.

The source of the unsaturated organic compounds may be animal, vegetable, or mineral. Thus, suitable olefins may be prepared by dehydrating alcohols obtained by hydrogenation of naturally occurring fats and oils (such as tallow, palm oil, cocoanut oil, olive oil), or the corresponding free acids. Or the olefins may be prepared by the Fischer-Tropsch synthesis, or by cracking waxes, or by cracking or dehydrogenating natural or synthetic (Fischer-Tropsch) petroleum or petroleum fractions, or by halogenating and then dehydrohalogenating such materials, or by polymerizing low molecular weight olefins.

Olefinic mixtures containing olefins and saturated hydrocarbons, derived from natural or synthetic (Fischer-Tropsch) petroleum directly or by thermolytic treatments thereof, constitute highly satisfactory initial materials for use in accordance with the present invention. Thermolytic treatments which have been found to yield large proportions of the desired olefins are catalytic and non-catalytic cracking, catalytic dehydrogenation, and combinations thereof. The preferred olefinic mixtures, comprising for the most part hydrocarbons having 10 to 30 carbon atoms per molecule, may be segregated from less desirable products of the treatment by fractional distillation. Since paraffinic, aromatic, or saturated alicyclic hydrocarbons or other relatively inert diluent liquids, especially liquids which are solvents for the olefin or olefins being reacted, may be present during formation of the nitrosation products, non-olefinic hydrocarbons present in such thermolytic-processed petroleum distillate fractions may be permitted to remain, and may be separated after the sulfitation treatment as water-insoluble oils. The petroleum may be fractionally distilled prior to the thermolytic treatment, to provide an oil containing an increased proportion of the hydrocarbons containing 10 and more carbon atoms per molecule. Saturated aromatic constituents, to the extent they are acted upon by the nitrosating agents, form active products which may be converted by aqueous sulfites and bisulfites to water-soluble surface-active products.

Examples of suitable olefins are cetene (derived from spermaceti and comprising for the most part cetene-1), 2-methylpentadecene-2, dodecene-1, pentadecene-7, tricosene-11, nondecene-9, 10-methyl-nondecene-9, and olefin-containing $C_{18}$-$C_{23}$ mixtures obtained by cracking topped, crude, natural or synthetic petroleum or by dehydrogenating a petroleum distillate (such as gas oil) or by reacting carbon monoxide and hydrogen in the presence of a catalyst such as cobalt (the Fischer-Tropsch synthesis). Some synthetic petroleums contain relatively high proportions of olefins as compared with natural petroleum and hence are more suitable for use without a concentration or thermolysis to increase the olefin content.

Suitable substituted olefins are esters of unsaturated fatty acids (such as, acrylic acid and oleic acid), mono- and di-esters of maleic acid, or mixtures such as the alkenyl succinic acid esters obtained by condensation of maleic anhydride with olefin fractions obtained by cracking or dehydrogenating natural or synthetic petroleum or by catalytic processes (such as the Fischer-Tropsch synthesis) and esterification of the unsaturated dicarboxylic acid anhydrides formed, with saturated mono-, di-, or trihydroxy alcohols (such as methanol, ethanol, propanol, isopropanol, the butanols and pentanols, glycol and glycerin and their homologs, lauryl alcohol, myristyl alcohol and cetyl alcohol); the esters of saturated fatty acids (such as acetic, lauric and stearic acids) with unsaturated alcohols (such as allyl alcohol and its homologs); the monoesters and the symmetrical and unsymmetrical di-esters of succinic acid with unsaturated alcohols, or with an unsaturated alcohol, on the one hand, and a saturated alcohol, on the other; the free oleic and alkenyl succinic acids and their alkali-metal salts and acid chlorides; the amides of saturated fatty acids and unsaturated amines; the amides of unsaturated fatty acids and amines (e. g., dimethyl amine, methyl butyl amine, ethyl butyl amine, etc.); and unsaturated ketones.

Specific examples of substituted olefins are butyl oleate, oleic acid, methyl oleate, isopropyl oleate, allyl stearate, allyl laurate, the di-n-octyl ester of octenyl (or nonenyl, decenyl, or undecenyl)-succinic acid, oleic acid amide, N-methyl oleic acid amide, N-dimethyl oleic amide, oleic acid anhydride, oleic acid chloride, oleic acid nitrile, N-allyl lauric acid amide, N-oleyl butyric acid amide, N-methyl N-oleyl propionic acid amide, N-ethyl N-oleyl acetic acid amide, N-methyl N-lauryl 4-hexenoic acid amide, N-decyl 3-pentenoic acid amide, 3-methyl-4-dimethyl-cyclopentane-1-carboxylic acid ester of allyl alcohol, and oleone.

Examples of suitable unsaturated ring compounds are lauryl cyclohexene and Δ²-3-methyl-4-dimethyl-cyclopentene-1-carboxylic acid ester of butanol-1.

When olefinic petroleum hydrocarbons are employed which contain color-forming constituents, the color of the final nitrosation-sulfitation products prepared therefrom can be materially improved by preliminary selective extraction with a polar solvent which is partly miscible with the petroleum hydrocarbon mixture, such as furfural or methyl Cellosolve (ethylene glycol monomethyl ether), as disclosed in application Serial No. 505,960, filed October 12, 1943, of L. J. Beckham and W. A. Fessler, now Patent Number 2,447,308. In preparing the nitrosation products, it is advantageous to employ as a nitrosating agent nitrosyl chloride containing minor proportions of nitrogen tetroxide, as disclosed in U. S. Patent 2,370,518.

The invention will be illustrated by the following specific examples in which parts and percentages are by weight and temperatures are in degrees centigrade. For purposes of illustration, the process will be described in Examples 1 to 12 as applied to a nitrosation-sulfitation product in the form of a mixture of sodium salts in solution in isobutyl alcohol, obtained from an olefin cut boiling from 150° to 275° C. at 10 mm. pressure (prepared by cracking a high-boiling petroleum distillate) by extracting the olefin cut with methyl Cellosolve, reacting the resulting raffinate (refined olefin cut) with nitrosyl chloride, followed by reaction with aqueous sodium sulfite solution, and extracting a 30% water solution of the resulting product (containing 17.8% carbon) with an equal volume of isobutyl alcohol. Analysis of a sample obtained by evaporating the solution and drying on a rotary drum drier showed said mixture of sodium salts to contain 52.2% of carbon and about 8% of sodium.

*Example 1*

One hundred and fifty parts of the isobutyl alcohol solution of nitrosation-sulfitation product were stirred at room temperature with 39 parts of 1 normal aqueous aluminum chloride solution for 4 hours at room temperature. The mixture was allowed to stratify and the alcohol layer was evaporated to dryness. The product thus obtained contained the nitrosation-sulfitation product in the form of the aluminum salts admixed with a minor amount of sodium salts. By extracting with water, the sodium salt content was reduced. The product was a buff solid, soluble in Stoddard Solvent, and trichloroethylene.

*Example 2*

The mixture of solutions employed in Example 1 was heated at the boiling point under reflux for 4 hours. The resulting product was similar to that of Example 1, but contained less sodium salts (96.7% of the sodium in the starting material was replaced by aluminum).

*Example 3*

Three hundred and seventy parts of the isobutyl alcohol solution of nitrosation-sulfitation product were shaken vigorously for 5 minutes with 89 parts of 1 normal aqueous aluminum chloride solution at room temperature, the mixture was allowed to stand and stratify, and the aqueous phase was removed. The treatment was repeated four times. The final isobutyl alcohol solution was evaporated to dryness and resulted in a product containing less sodium salts than the product of Example 1.

*Example 4*

Three hundred and fifty parts of the isobutyl alcohol solution of nitrosation-sulfitation product were treated in the manner of Example 3 with five portions, each of 38 parts, of 2 normal aqueous cupric nitrate solution. The resulting dried product was a light-green solid, soluble in water and trichloroethylene.

Example 5

Three hundred and fifty parts of the isobutyl alcohol solution of nitrosation-sulfitation product were treated in the manner of Example 3 with five portions, each of 43 parts, of 2 normal aqueous nickel nitrate solution. The resulting dried product was a buff solid, soluble in water and trichloroethylene.

Example 6

Three hundred and twenty parts of the isobutyl alcohol solution of nitrosation-sulfitation product were treated in the manner of Example 3 with five portions, each of 31 parts, of 2 normal aqueous cadmium nitrate solution. The resulting dried product was a buff solid, soluble in water and Stoddard Solvent.

Example 7

Three hundred and fifty parts of the isobutyl alcohol solution of nitrosation-sulfitation product were treated with 190 parts of 2 normal aqueous cobalt nitrate solution. The mixture was slow in separating into two phases. One hundred and ninety parts of water were added, whereupon separation took place. The alcohol phase was then treated with three additional portions, each of 76 parts of 1 normal aqueous cobalt nitrate solution. The resulting dried product was a light red solid, soluble in Stoddard Solvent and trichloroethylene.

Example 8

Three hundred and fifty parts of the isobutyl alcohol solution of nitrosation-sulfitation product were shaken vigorously for 5 minutes with 38 parts of 2 normal aqueous manganese sulfate solution at room temperature, the mixture was allowed to stand and stratify, and the aqueous phase was removed. The treatment was repeated four times. The final isobutyl alcohol solution was evaporated to dryness and resulted in a product containing less sodium salts than the product of Example 1.

Example 9

Three hundred and sixty parts of the isobutyl alcohol solution of nitrosation-sulfitation product were shaken vigorously for 5 minutes with 39 parts of 2 normal aqueous calcium chloride solution at room temperature, the mixture was allowed to stand and stratify, and the aqueous phase was removed. The treatment was repeated four times. The final isobutyl alcohol solution was evaporated to dryness and resulted in a product containing less sodium salts than the product of Example 1.

Example 10

Three hundred and seventy parts of the isobutyl alcohol solution of nitrosation-sulfitation product were shaken vigorously for 5 minutes with 41 parts of 2 normal aqueous magnesium nitrate solution at room temperature, the mixture was allowed to stand and stratify, and the aqueous phase was removed. The treatment was repeated four times. The final isobutyl alcohol solution was evaporated to dryness and resulted in a product containing less sodium salts than the product of Example 1.

Example 11

Three hundred parts of the isobutyl alcohol solution of nitrosation-sulfitation product were shaken vigorously for 5 minutes with 33 parts of 2 normal aqueous barium chloride solution at room temperature, the mixture was allowed to stand and stratify, and the aqueous phase was removed. The treatment was repeated four times. The final isobutyl alcohol solution was evaporated to dryness and resulted in a product containing less sodium salts than the product of Example 1.

Example 12

Three hundred and sixty parts of the isobutyl alcohol solution of nitrosation-sulfitation product were treated with 150 parts of 3 normal chromic nitrate solution. The mixture was slow in separating into two phases. Three hundred parts of water were added, whereupon separation took place. The alcohol phase was then treated with three additional portions, each of 90 parts of 1 normal aqueous chromic nitrate. The resulting dried product was a dark-green solid, soluble in water and Stoddard Solvent.

Example 13

A nitrosation-sulfitation product in the form of a mixture of sodium salts containing 19.26% carbon—obtained from an olefin cut boiling from 150° to 275° at 10 mm. pressure (prepared by coil-cracking a topped crude oil) by extracting the olefin cut with furfural, reacting the resulting raffinate (refined olefin cut) with nitrosyl chloride, followed by reaction with aqueous sodium sulfite solution—was dissolved in water to form a solution containing 30% solids. This solution was passed counter to a flow of isobutyl alcohol containing 14% water in a tower 10 feet long and having an inside diameter of 1.5 inches, packed with 3- to 4-mesh crushed brick, the packing occupying about 6.5 feet of the length of the tower. The ratio of the rates of introduction of alcoholic solvent and aqueous solution into the column was 1:1, each being introduced at a rate of 1,000 parts per hour. The temperature in the tower was kept at 25°. Effluent from the top of the tower was an isobutyl alcohol solution of nitrosation-sulfitation product greatly enriched in carbon content. This solution was introduced near the base of a second packed tower of the same dimensions and passed counter to a flow of 300 parts per hour of 1 normal aluminum chloride solution introduced near the top of the tower. The temperature in this tower was also kept at 25°. Effluent from the top of this tower was an isobutyl alcohol solution of the aluminum salt of the nitrosation-sulfitation product, which salt was obtained as a buff solid by evaporation of the solvent.

By employing a 1 normal aqueous solution of ferric chloride or zinc chloride in the manner set out in the preceding examples, the iron and zinc salts of the nitrosation-sulfitation products may be similarly obtained.

It will be evident to those skilled in the art that the invention is not limited to the details of the foregoing illustrative examples and that changes can be made without departing from the scope of the invention.

Thus, instead of the polyvalent metal salts employed in the above examples, water-soluble salts of other polyvalent metals may be employed and water-soluble polyvalent metal salts may be employed whose anions are derived from other acids that form alkali metal salts (especially sodium salts) having greater solubility in water, and lesser solubility in the alcoholic solvent used, than the corresponding polyvalent metal salts of the nitrosation-sulfitation product.

Instead of isobutyl alcohol employed in the above examples, other alcohols of low water-solubility, or mixtures thereof with water-immiscible solvents, or mixtures of water-soluble alcohols with water-immiscible solvents may be employed; for example, normal butyl alcohol, normal hexyl alcohol, normal octyl alcohol, mixtures of isobutyl alcohol and benzene, mixtures of isobutyl alcohol and petroleum naphtha, mixtures of isopropyl alcohol and benzene, and mixtures of isopropyl alcohol and petroleum naphtha.

I claim:

1. A process for the preparation of a surface-active organic nitrosation-sulfitation product in the polyvalent metal salt form, which comprises reacting a water-soluble salt of a polyvalent metal with an organic nitrosation-sulfitation product which is in the form of a water-soluble salt, in a liquid reaction medium containing water and an alcoholic solvent of low water-solubility selected from the group consisting of alcohols of low water-solubility, mixtures of alcohols with liquid aromatic hydrocarbons, and mixtures of alcohols with low-boiling paraffinic hydrocarbons, said organic nitrosation-sulfitation product including sulfonated ketones, sulfonated amines, sulfonated alkylidene sulfamates, sulfonated alkyl sulfamates and bisulfite addition products of sulfonated alkylidene sulfamates and having been obtained by reacting a sulfite with an addition product resulting from the reaction of a nitrosating agent with an unsaturated organic compound of 10 to 30 carbon atoms having at least one non-aromatic

linkage, the anion of said water-soluble polyvalent metal salt and the cation of said nitrosation-sulfitation product forming water-soluble salts having greater solubility in water and lesser solubility in said alcoholic solvent than the polyvalent metal salt of said organic nitrosation-sulfitation product.

2. A process for the preparation of a surface-active organic nitrosation-sulfitation product in the polyvalent metal salt form, which comprises intimately contacting an aqueous solution of a water-soluble polyvalent metal salt with a solution of an organic nitrosation-sulfitation product in the form of a water-soluble alkali metal salt in an alcoholic solvent of low water-solubility selected from the group consisting of alcohols of low water-solubility, mixtures of alcohols with liquid aromatic hydrocarbons, and mixtures of alcohols with low-boiling paraffinic hydrocarbons, said organic nitrosation-sulfitation product including sulfonated ketones, sulfonated amines, sulfonated alkylidene sulfamates, sulfonated alkyl sulfamates and bisulfite addition products of sulfonated alkylidene sulfamates and having been obtained by reacting a sulfite with an addition product resulting from the reaction of a nitrosating agent with an unsaturated organic compound of 10 to 30 carbon atoms having at least one non-aromatic

linkage, and said polyvalent metal salt being derived from an acid that forms alkali metal salts having greater solubility in water and lesser solubility in said alcoholic solvent than the corresponding polyvalent metal salt of said organic nitrosation-sulfitation product, whereby a solution of the organic nitrosation-sulfitation product in the form of a salt of said polyvalent metal in said alcoholic solvent is produced, and separating the resulting alcoholic solution from the remaining reaction mixture.

3. A process for the preparation of a surface-active organic nitrosation-sulfitation product in the polyvalent metal salt form, which comprises reacting a water-soluble polyvalent metal salt with an organic nitrosation-sulfitation product in the alkali metal salt form, in a liquid reaction medium containing an alcohol of low water-solubility and water, said nitrosation-sulfitation product including sulfonated ketones, sulfonated amines, sulfonated alkylidene sulfamates, sulfonated alkyl sulfamates, and bisulfite addition products of sulfonated alkylidene sulfamates and having been obtained by reacting a sulfite with an addition product resulting from the reaction of a nitrosating agent of the class consisting of nitrosyl chloride, nitrosyl bromide, nitrogen tetroxide, and nitrogen trioxide with an unsaturated organic compound having at least one non-aromatic

linkage and being selected from the class consisting of olefin hydrocarbons and carboxyl-substituted unsaturated hydrocarbons the carbon content of which lies within the range 10 to 30 carbon atoms, said polyvalent metal salt being derived from an acid that forms alkali metal salts having greater solubility in water and lesser solubility in said alcoholic solvent than the corresponding polyvalent metal salt of said organic nitrosation-sulfitation product, whereby a solution of the organic nitrosation-sulfitation product in the form of a salt of said polyvalent metal in said alcoholic solvent is produced, and separating the resulting alcoholic solution from the remaining reaction mixture.

4. A process for the preparation of a surface-active organic nitrosation-sulfitation product in the polyvalent metal salt form, which comprises intimately contacting an aqueous solution of a water-soluble polyvalent metal salt with a solution of an organic nitrosation-sulfitation product in the alkali metal salt form in an alcoholic solvent of low water-solubility selected from the group consisting of alcohols of low water-solubility, mixtures of alcohols with liquid aromatic hydrocarbons, and mixtures of alcohols with low-boiling paraffinic hydrocarbons, said organic nitrosation-sulfitation product including sulfonated ketones, sulfonated amines, sulfonated alkylidene sulfamates, sulfonated alkyl sulfamates, and bisulfite addition products of sulfonated alkylidene sulfamates and having been obtained by reacting a sulfite with an addition product resulting from the reaction of a nitrosating agent of the class consisting of nitrosyl chloride, nitrosyl bromide, nitrogen tetroxide, and nitrogen trioxide with an unsaturated organic compound having at least one non-aromatic

linkage and being selected from the class consisting of olefin hydrocarbons and carboxyl-substituted unsaturated hydrocarbons the carbon content of which lies within the range 10 to 30 carbon atoms, said polyvalent metal salt being derived from an acid that forms alkali metal salts having greater solubility in water and lesser solubility in said alcoholic solvent than the corresponding polyvalent metal salt of said organic nitrosation-sulfitation product, whereby a solution of the organic nitrosation-sulfitation product in the form of a salt of said polyvalent metal in said alcoholic solvent is produced, and separating the resulting alcoholic solution from the remaining reaction mixture.

5. A process for the preparation of a surface-active organic nitrosation-sulfitation product in the polyvalent metal salt form, which comprises intimately contacting an aqueous solution of a water-soluble polyvalent metal salt of an inorganic acid with a solution of a water-soluble organic nitrosation-sulfitation product in an alcoholic solvent of low water-solubility selected from the group consisting of alcohols of low water-solubility, mixtures of alcohols with liquid aromatic hydrocarbons, and mixtures of alcohols with low-boiling paraffinic hydrocarbons, said organic nitrosation-sulfitation product including sulfonated ketones, sulfonated amines, sulfonated alkylidene sulfamates, sulfonated alkyl sulfamates, and bisulfite addition products of sulfonated alkylidene sulfamates and having been obtained by reacting a sulfite with an addition product resulting from the reaction of a nitrosating agent of the class consisting of nitrosyl chloride, nitrosyl bromide, nitrogen tetroxide, and nitrogen trioxide with an unsaturated organic compound having at least one non-aromatic

linkage and being selected from the class consisting of olefin hydrocarbons and carboxyl-substituted unsaturated hydrocarbons the carbon content of which lies within the range 10 to 30 carbon atoms, whereby a solution of the organic nitrosation-sulfitation product in the form of a salt of said polyvalent metal in said alcoholic solvent is produced, and separating the resulting alcoholic solution from the remaining reaction mixture.

6. A process for the preparation of a surface-active organic nitrosation-sulfitation product in the polyvalent metal salt form, which comprises intimately contacting an aqueous solution of a water-soluble polyvalent metal salt of an inorganic acid with a solution of a water-soluble organic nitrosation-sulfitation product in an alcoholic solvent of low water-solubility including an aliphatic monohydric alcohol of 4 to 8 carbon atoms, said nitrosation-sulfitation product including sulfonated ketones, sulfonated amines, sulfonated alkylidene sulfamates, sulfonated alkyl sulfamates, and bisulfite addition products of sulfonated alkylidene sulfamates and having been obtained by reacting a sulfite with an addition product resulting from the reaction of a nitrosating agent of the class consisting of nitrosyl chloride, nitrosyl bromide, nitrogen tetroxide, and nitrogen trioxide with an unsaturated organic compound having at least one non-aromatic

linkage and being selected from the class consisting of olefin hydrocarbons and carboxyl-substituted unsaturated hydrocarbons the carbon content of which lies within the range 10 to 30 carbon atoms, whereby a solution of the organic nitrosation-sulfitation product in the form of a salt of said polyvalent metal in said alcoholic solvent is produced, and separating the resulting alcoholic solution from the remaining reaction mixture.

7. A process for the preparation of a surface-active organic nitrosation-sulfitation product in the polyvalent metal salt form, which comprises intimately contacting an aqueous solution of a water-soluble polyvalent metal salt with a solution, in an alcoholic solvent of low water-solubility selected from the group consisting of alcohols of low water-solubility, mixtures of alcohols with liquid aromatic hydrocarbons, and mixtures of alcohols with low-boiling paraffinic hydrocarbons, of a water-soluble organic nitrosation-sulfitation product in the form of salts of a mixture of sulfonic acids, said sulfonic acids including sulfonated ketones, sulfonated amines, sulfonated alkylidene sulfamates, sulfonated alkyl sulfamates, and bisulfite addition products of sulfonated alkylidene sulfamates corresponding to organic anions of a nitrosation-sulfitation product obtained by reacting a sulfite with an addition product resulting from the reaction of a nitrosating agent of the class consisting of nitrosyl chloride, nitrosyl bromide, nitrogen tetroxide, and nitrogen trioxide with an olefin hydrocarbon of 10 to 30 carbon atoms, the anion of said water-soluble polyvalent metal salt and the cations of said nitrosation-sulfitation product forming water-soluble salts having greater solubility in water and lesser solubility in said alcoholic solvent than the polyvalent metal salts of said mixture of sulfonic acids, whereby a solution of the polyvalent metal salts of said sulfonic acids in said alcoholic solvent is produced, separating the resulting alcoholic solution from the remaining reaction mixture, and recovering the polyvalent metal salts of said sulfonic acids from the resulting alcoholic solution.

8. A process for the preparation of a surface-active organic nitrosation-sulfitation product in the polyvalent metal salt form, which comprises intimately contacting an aqueous solution of a water-soluble polyvalent metal salt with a solution, in an alcohol of low water-solubility, of a water-soluble organic nitrosation-sulfitation product in the form of salts of a mixture of sulfonic acids, said sulfonic acids including sulfonated ketones, sulfonated amines, sulfonated alkylidene sulfamates, sulfonated alkyl sulfamates, and bisulfite addition products of sulfonated alkylidene sulfamates corresponding to organic anions of a nitrosation-sulfitation product obtained by reacting a sulfite with an addition product resulting from the reaction of a nitrosating agent of the class consisting of nitrosyl chloride, nitrosyl bromide, nitrogen tetroxide, and nitrogen trioxide with an olefin hydrocarbon of 10 to 30 carbon atoms, the anion of said water-soluble polyvalent metal salt and the cations of said nitrosation-sulfitation product forming water-soluble salts having greater solubility in water and lesser solubility in said alcoholic solvent than the polyvalent metal salts of said mixture of sulfonic acids, whereby a solution of the polyvalent metal salts of said sulfonic acids in said alcoholic solvent is produced, separating the resulting alcoholic solution from the remaining reaction mixture, and recovering the polyvalent metal salts of said sulfonic acids from the resulting alcoholic solution.

9. A process for the preparation of a surface-active organic nitrosation-sulfitation product in the polyvalent metal salt form, which comprises intimately contacting an aqueous solution of a water-soluble polyvalent metal salt of an inorganic acid with a solution, in an alcoholic solvent of low water-solubility selected from the group consisting of alcohols of low water-solubility, mixtures of alcohols with liquid aromatic hydrocarbons, and mixtures of alcohols with low-boiling paraffinic hydrocarbons, of a water-soluble organic nitrosation-sulfitation product in the form of alkali metal salts of a mixture of sulfonic acids, said sulfonic acids including sulfonated ketones, sulfonated amines, sulfonated alkylidene sulfamates, sulfonated alkyl sulfamates, and bisulfite addition products of sulfonated alkylidene sulfamates corresponding to organic anions of a nitrosation-sulfitation product obtained by reacting an alkali metal sulfite with an addition product resulting from the reaction of a nitrosating agent of the class consisting of nitrosyl chloride, nitrosyl bromide, nitrogen tetroxide, and nitrogen trioxide with an olefin hydrocarbon of 12 to 23 carbon atoms, the anion of said water-soluble polyvalent metal salt forming alkali metal salts having greater solubility in water and lesser solubility in said alcoholic solvent than the polyvalent metal salts of said mixture of sulfonic acids, whereby a solution of the polyvalent metal salts of said sulfonic acids in said alcoholic solvent is produced, separating the resulting alcoholic solution from the remaining reaction mixture, and recovering the polyvalent metal salts of said sulfonic acids from the resulting alcoholic solution.

10. A process for the preparation of a surface-active organic nitrosation-sulfitation product in the polyvalent metal salt form, which comprises intimately contacting an aqueous solution of a water-soluble polyvalent metal salt of an inorganic acid with a solution, in a monohydric aliphatic alcohol of 4 to 8 carbon atoms, of a water-soluble organic nitrosation-sulfitation product in the form of a mixture of sodium salts of sulfonic acids, said sulfonic acids including sulfonated ketones, sulfonated amines, sulfonated alkylidene sulfamates, sulfonated alkyl sulfamates and bisulfite addition products of sulfonated alkylidene sulfamates corresponding to organic anions of a nitrosation-sulfitation product obtained by reacting a sodium sulfite with an addition product resulting from the reaction of a nitrosating agent of the class consisting of nitrosyl chloride, nitrosyl bromide, nitrogen tetroxide, and nitrogen trioxide with a mixture of olefin hydrocarbons of 12 to 23 carbon atoms, the anion of said water-soluble polyvalent metal salt forming sodium salts having greater solubility in water and lesser solubility in said alcohol than the polyvalent metal salts of said mixture of sulfonic acids, whereby a solution of the polyvalent metal salts of said sulfonic acids in said alcohol is produced, separating the resulting alcohol solution from the remaining reaction mixture, and recovering the polyvalent metal salts of said sulfonic acids from the resulting alcohol solution.

WILLIAM A. FESSLER.

REFERENCES CITED

The following references are of record in the file of this patent:

UNITED STATES PATENTS

| Number | Name | Date |
|---|---|---|
| 2,206,002 | Deutser et al. | June 25, 1940 |
| 2,304,230 | Archibald et al. | Dec. 8, 1942 |
| 2,411,832 | Linford et al. | Nov. 26, 1946 |